United States Patent
Uhlig

(10) Patent No.: US 12,007,549 B1
(45) Date of Patent: Jun. 11, 2024

(54) PASSIVE COLOR NIGHT VISION

(71) Applicant: FYOTECH LLC, Dayton, NV (US)

(72) Inventor: Hans H. Uhlig, Dayton, NV (US)

(73) Assignee: FYOTECH LLC, Dayton, NV (US)

( * ) Notice: Subject to any disclaimer, the term of this patent is extended or adjusted under 35 U.S.C. 154(b) by 0 days.

(21) Appl. No.: 18/532,193

(22) Filed: Dec. 7, 2023

Related U.S. Application Data

(63) Continuation of application No. 17/943,035, filed on Sep. 12, 2022.

(60) Provisional application No. 63/319,768, filed on Mar. 14, 2022.

(51) Int. Cl.
| | |
|---|---|
| *H01L 31/153* | (2006.01) |
| *G02B 23/12* | (2006.01) |
| *G06T 5/50* | (2006.01) |
| *H04N 5/33* | (2023.01) |

(52) U.S. Cl.
CPC ............... *G02B 23/12* (2013.01); *G06T 5/50* (2013.01); *H04N 5/33* (2013.01); *G06T 2207/10048* (2013.01)

(58) Field of Classification Search
CPC . G06T 2207/10004; G06T 2207/10024; G06T 2207/10; G06T 2207/10028; G06T 2207/10048; G06T 2207/20; G06T 2207/20172; H04N 23/11; H04N 5/33; H04N 5/30; H04N 23/88; H04N 23/85
See application file for complete search history.

(56) References Cited

FOREIGN PATENT DOCUMENTS

CN 110651301 A * 1/2020 ........... G06N 3/0454

* cited by examiner

*Primary Examiner* — Don K Wong
(74) *Attorney, Agent, or Firm* — Smith Tempel Blaha LLC; Gregory Scott Smith

(57) ABSTRACT

A novel Passive Color Night Vision (PCNV) that provides a fully integrated dynamically controlled passive color night vision algorithm to work in both daylight or in low light conditions. The PCNV can dynamically switch or adjust between lighted vision and night vision. The PCNV is a passive solution that does not require active illumination by the use of an IR emitter diode as found in the prior art night vision solutions. Visible and IR spectrum composite image data manipulation is performed to achieve true color in low light conditions.

16 Claims, 15 Drawing Sheets

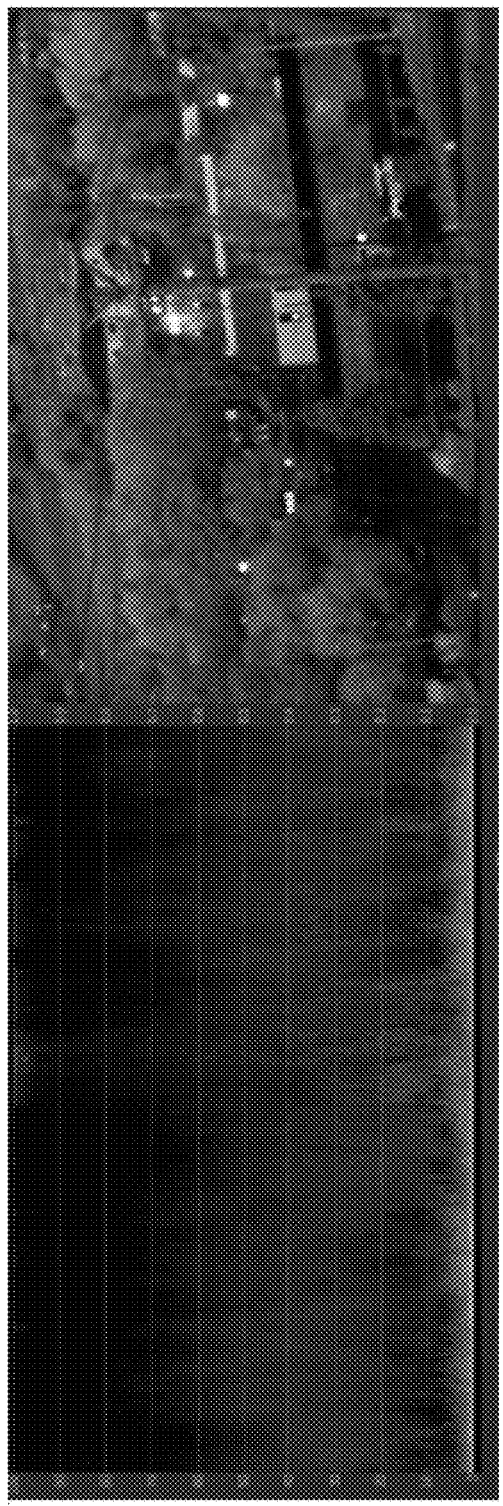
FIG. 9B
FIG. 9A
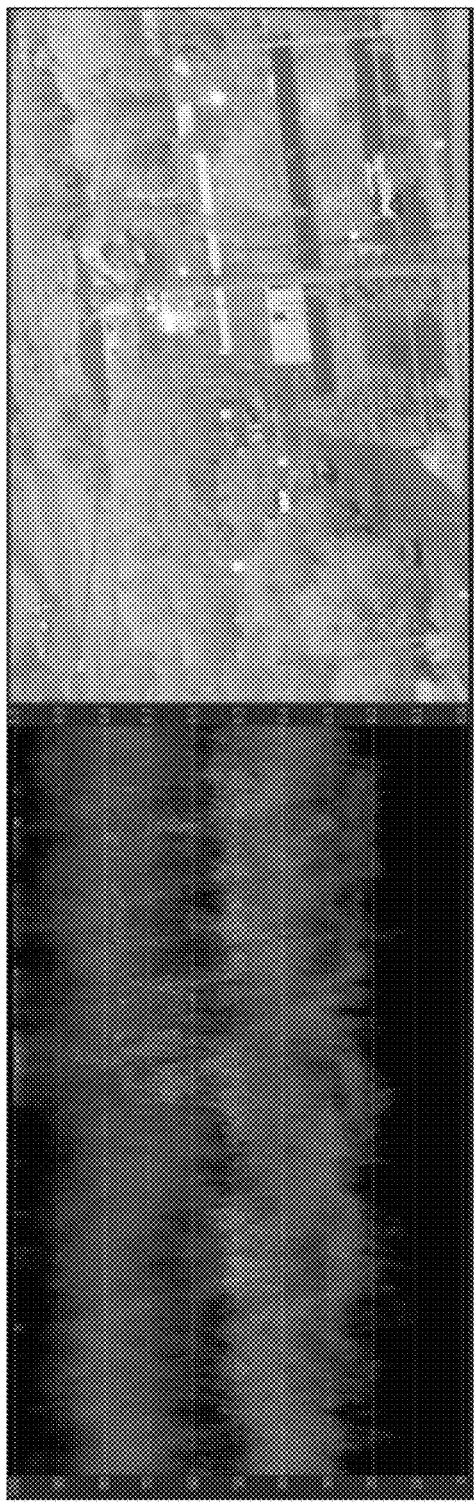
FIG. 10B
FIG. 10A

FIG. 14A
FIG. 14B

PASSIVE COLOR NIGHT VISION

This application is a continuation application of the United States patent application filed on Sep. 12, 2022 and assigned Ser. No. 17/943,035, which application and all applications it references are hereby incorporated by reference.

BACKGROUND

The human eye, unlike the eyes of many animals, does not operate well in low-light conditions. Animals that see well in low-light conditions typically have a tapetum lucidum, or tissue behind the retina that reflects light back through the retina, thus increasing the light available to the photoreceptors. You have all seen this in action when you shine a flashlight into your pet's faces and their eyes seem to glow in the dark. Or that bright warning signal you get on the side of the road at night when your headlights bounce off of the eyes of a deer or other animal that is near or crossing the road. That is the light that is reflecting from the tapetum lucidum. Humans do not have a tapetum lucidum. Without the tapetum lucidum, in low-light conditions, it is difficult for a human to detect objects and especially color. The tapetum lucidum helps to reflect light back through the retina, thus giving animals the ability to see in low-light conditions better than humans.

Night vision is the ability to see in low-light conditions. For humans, this can be attained either naturally with scotopic vision (which is limited) or through a night-vision device. To be able to see objects at night, there needs to be both sufficient spectral range and sufficient intensity range.

Spectral range is the range of color wavelengths that a receiver can detect. The spectral range of the human eye is limited to a small portion of the electromagnetic spectrum called visible light. The sensitivity of the human eye to light of a certain intensity varies strongly over the spectral range between 380 and 800 nm. Under daylight conditions, the average normal sighted human eye is most sensitive at a wavelength of 555 nm. Upon examination of the light wavelength spectrum one can determine that 555 nm is perceived to be green. Thus, the shade of green at 555 nm produces the impression of highest "brightness" when compared to light at other wavelengths.

Intensity range is the range of light intensity that can be perceived by humans. Sufficient intensity range is simply the ability to see with very small quantities of light. Humans can see over a very large range of light intensity, such as a range from photon fluxes of less than $10^{-2}$ photons/um$^2$/sec (i.e, starlight) to greater than $10^8$ photons/um$^2$/sec (i.e., bright sunlight). Enhanced intensity range is achieved via technological means through the use of an image intensifier, gain multiplication CCD, or other very low-noise and high-sensitivity arrays of photodetectors.

The problem is that at night, the light intensity is diminished and spectrum range is reduced. As such, everything moves towards shades of gray.

The photopic sensitivity of the human eye to monochromatic light at 490 nm amounts to 20% of its sensitivity at 555 nm. Consequently, when a source of monochromatic light at 490 nm emits five times as much power (expressed in watts) than an otherwise identical source of monochromatic light at 555 nm, both sources produce the impression of same "brightness" to the human eye.

Since the dawning of time, or really we should say since the dusking of time, man has realized the need to improve night vision. Improvements began with the discovery of fire, and then the application of that discovery in use for torches. The solution was simply to bring additional light with you wherever you go. And this migrated from fire to battery powered light sources, electrical grid powered light sources etc. But it does not take a large imagination to realize the limits of this as an ultimate solution and the circumstances in which it is simply not practical. Such as when one wants to see but not be seen. Thus, there arose a need in the art for the ability to improve night vision by increasing the ability to see in low-light conditions. This is referred to as night vision.

Night vision technologies can be broadly divided into three main categories: image intensification, active illumination, and thermal imaging.

Image intensification operates by magnifying the amount of received photons from various natural sources such as starlight or moonlight. Examples of such technologies include night glasses and low light cameras. In the military context, Image Intensifiers are often called "Low Light TV" since the video signal is often transmitted to a display within a control center. These are usually integrated into a sensor containing both visible and IR detectors.

Active illumination couples imaging intensification technology with an active source of illumination in the near infrared (NIR) or shortwave infrared (SWIR) band. Examples of such technologies include low light cameras.

Active infrared night-vision combines infrared illumination of spectral range 700-1,000 nm (just below the visible spectrum of the human eye) with CCD cameras sensitive to this light. The resulting scene, which is apparently dark to a human observer, appears as a monochrome image on a normal display device.

Thermal vision detects the temperature difference between background and foreground objects. Some organisms are able to sense a crude thermal image by means of special organs that function as bolometers. This allows thermal infrared sensing in snakes, which functions by detecting thermal radiation. Thermal imaging devices make small temperature differences visible. They are widely used to complement new or existing security networks, and for night vision on aircraft, where they are commonly referred to as "FLIR" (for "forward-looking infrared").

The next generation in improvement of night vision includes the introduction of color capabilities or expanding the spectrum range in low-light conditions. Night vision colorization using multispectral image increases the reliability of interpretation, and thus this technology is good for visual analysis (human vision). A purpose of night vision colorization is to resemble a natural scene in colors, which differs from false coloring. There are basically two categories of colorization: color fusion and color mapping. Color fusion directly combines multispectral night vision images into a color-version image by mixing pixel intensities. Color mapping usually maps the color properties of a false-colored night vision image (source) onto that of a true-color daylight picture (target). Four coloring mapping methods exist, statistical matching, histogram matching, joint histogram matching, and lookup table (LUT). The segmentation-based color mapping method produces the most impressive and realistic colorization but it requires heavy computations. Color fusion and LUT-based methods run very fast but their results are less realistic. The statistical matching method always provides acceptable results. Histogram matching and joint-histogram matching can generate more impressive colors when the color distributions between source and target are similar.

What is needed in the art is a technique to achieve the fast results available through lookup table techniques along with the reliability, accuracy, realism and impressive colors of other techniques. These needs as well as others are addressed in the various embodiments of the present invention presented herein.

BRIEF SUMMARY

The present invention addresses the above-identified needs in the art, as well as other needs by presenting embodiments of a novel Passive Color Night Vision (PCNV) method, algorithm and technique. Advantageously, the various embodiments of the PCNV algorithm provide a fully integrated dynamically controlled passive color night vision algorithm to work in both daylight or in low-light conditions. Some embodiments of the present invention can dynamically switch or adjust between lighted vision and night vision. In addition, the embodiments present a completely passive solution that does not require active illumination by the use of an IR emitter diode as found in the prior art night vision solutions. Various embodiments operate by performing visible and IR spectrum composite image data manipulation. Advantageously, the various embodiments provide true color in low-light conditions.

BRIEF DESCRIPTION OF THE DRAWINGS

The various embodiments, features and aspects of the present invention can be seen in connection with the following drawings in which like numeral and labels represent like elements throughout the several views in which:

FIG. 9A illustrates the raw sensor data of an image illustrating the intensity of the RGB channels.

FIG. 9B illustrates the same image of FIG. 9A before being adjusted.

FIG. 10A illustrates the raw sensor data after the application of RGB balance by adjustment with the IRin multiplied by the luma matrix.

FIG. 10B illustrates the effect on the image from FIG. 9B.

FIG. 10A illustrates a standard LUT.

FIG. 10B illustrates a 3D-LUT.

FIG. 14A is a 3D LUT color shift result of the image in FIG. 13.

FIG. 14B illustrates the results of adjusting the saturation, contrast and exposure of FIG. 14A.

DETAILED DESCRIPTION OF VARIOUS EMBODIMENTS

Figures 1A, 1B:
FIG. 1A is an image of a scene taken in low-light conditions.
FIG. 1B is the same image after the application of an embodiment of the PCNV process.

The present invention, as well as features and aspects thereof, is directed towards providing a technique to create true color images and video, in particular during low-light conditions, and to provide a system that can dynamically adjust to improve quality. The various embodiments can be utilized in applications such as drones, autonomous vehicles, non-autonomous vehicles, security cameras, robotics, police cameras, surveillance, marine systems, scopes, binoculars, night vision goggles and glasses as a few non-limiting examples. In general, the various embodiments of the invention operate to receive image data of a target, such as a scene or subject or environment, from an image collector device. The various embodiments then operate to generate a vivid and accurate color image from the image data even when there is a limited amount of light present.

In an exemplary embodiment, a passive color night vision (PCNV) algorithm operates by first collecting or receiving raw source RGB and IR sensor data and transforming this raw source into digitized RGB and IR data. The digitized IR data is then utilized to dynamically transform the digitized RGB data to true color. At this point, the image can be output to a high-definition (HD) color display, stored in any digital media, transmitted to a device for further use or operation, etc.

More specifically, the PCNV algorithm collects raw source RGB and IR sensor data. The raw RGB image can be captured using an unmodified specific image sensor. Those skilled in the relevant art will be aware of available RGB image sensors such as those available from ONSEMI, DIGI-KEY, BASLER, CANON, SONY, etc. In addition, IR sensor data is obtained from the same sensor or an additional sensor that operates to detect and measure infrared radiation in the surrounding environment. The raw RGB data and the IR data are used to generate the digital RGB which contains a viewable color image as well as the IR data.

A raw image file contains minimally processed data from an image sensor, such as one utilized in a digital camera or other image scanner. In digital photography, the raw file can be viewed as being similar to the role that photographic film plays in film photography. The raw files contain the full resolution (i.e. 12 or 14 bits as a non-limiting example) of data as read from the image sensor pixels. A raw RGB file is an obtained scan that is not yet processed and not ready to be printed, viewed or edited. The raw RGB file captures the radiometric characteristics of the scene. Radiometric resolution corresponds to the sensitivity of a sensor—the ability to measure and to enable distinction within the same spectral band of differences in the electromagnetic energy reflected by surface. Thus, the radiometric characteristics and be described as the physical information about the light intensity and color of the scene or target. The raw RGB file contains the information required to produce a viewable image derived from the obtained sensor data.

Transforming the raw RGB sensor data to digitized RGB can be performed by the image sensor or an additional device, such as an analog to digital converter.

The digitized RGB is then combined with the Infrared (IR) data to dynamically transform the collected data to true color. The process to conduct this transformation operates to adjust the IR gain dynamically using a 3-dimensional look up table (LUT).

Finally, the image can be output to a high-definition (HD) color display to be recorded or observed, or otherwise provided to another system or user.

The various aspects, features, operations, etc., of the various embodiments of the invention will now be described or illustrated by providing a few examples, followed by a more detailed description of the algorithm and/or process.

FIG. 1A is a displayed image of a scene taken in low-light conditions. FIG. 1B is the same image after the application of an embodiment of the PCNV process. As such, it should be appreciated that the image presented in FIG. 1A, which was captured at night, had sufficient lighting for the PCNV process to generate the color image presented in FIG. 1B. At night, even with an overcast sky, photons are available from multiple sources such as stars, planets, satellites, sunlight scattered on dust particles in the solar system (zodiacal light), celestial, artificial light sources, atmospheric scattered light off water and dust particles, and organic (bio-chemical) light emission such as chlorophyll fluorescence (aka The Kautsky effect). The culmination of these sources makes up the majority of available light at night.

The Kautsky effect (also named fluorescence transient, fluorescence induction or fluorescence decay) is based on the phenomenon existing in the typical variation on the behavior of a plant fluorescence when exposed to light. When dark-adapted photosynthesizing cells are illuminated with continuous light, chlorophyll fluorescence displays characteristic changes in intensity accompanying the induction of photosynthetic activity.

Thus, when the plant is illuminated from a source, the fluorescence intensity increases with a time constant in the microsecond or millisecond range. After a few seconds the intensity falls again and finally reaches a steady-state level. The initial rise of the fluorescence intensity is attributed to the progressive saturation of the reaction centers in the photosynthesis. Therefore, the quenching of the fluorescence by the photosynthesis decreases with the time of illumination, with a corresponding increase of the fluorescence intensity. The quenching by the photosynthesis pathway is called photochemical quenching. The slow decrease of the fluorescence intensity at later times is termed non-photochemical quenching. Non-photochemical quenching is most likely due to a protection mechanism the plant utilizes to avoid the adverse effect of an excess of light. Several processes cause non-photochemical quenching, e.g., photoinhibition.

The quantum yield of photosynthesis, which is also the photo-chemical quenching of fluorescence, is calculated through the following equation:

$$\Phi p = (Fm - F0)/Fm = Fv/Fm$$

Where:
F0 is the low fluorescence intensity, which is measured by a short light flash that is not strong enough to cause photochemistry, and thus does not induce fluorescence;
Fm is the maximum fluorescence that can be obtained from a sample by measuring the highest intensity of fluorescence after a saturating flash; and
Fv is the difference between the measured values Fv.

Further information on the Kautsky effect can be obtained from the following reference:
Kautsky H., Hirsch A. (1931) "Neue Versuche zur Kohlensäureassimilation", Naturwissenschaften. 19(48):964

As shown in FIG. 1A and FIG. 1B, a difference in hue can be found by comparing plants that are emitting photons and objects that are reflecting emitted photons. This observation is crucial for identifying the nature of the object (emitter vs. reflector) but also the activity and conditions of an organic emitter.

Organic emitters produce IR photons within specific wavelength ranges, which are well known to those skilled in the art, whereas colored surfaces (ground, asphalt, walls, paints etc.) of which the emitted IR photons reflect are falsified by the reflecting surface color. Measuring the IR energy from various locations or spots in an image or target can be used to determine if the IR energy is coming from an emitter or a reflector. Emitters will provide the entire spectrum of IR energy ranging over the full or approximately the full IR spectrum. However, reflectors are typically going to absorb some portion of the IR spectrum and then reflect only portions if the IR energy spectrum but also will reflect R, G, B spectrum portions as well. By analyzing which portions of the IR and R, G, B spectrums are being received, the type of source an be identified. For instance, if the received IR energy is across the entire spectrum only (i.e., no R, G, B spectrum), it can be concluded that this is an emitter and most likely foliage or an IR transmitter. However, if portions of the IR spectrum are missing or are diluted in intensity, then a co-relation between the missing or diluted in intensity frequencies and the type of material, color of material, type of surface can be made to identify the reflector and potentially any color attributes of the reflector. The surface of an object is very important when it comes to how IR radiation is absorbed, emitted and/or reflected. For example, a black matted surface will absorb IR very well and then also operate as an emitter if the IR increases the temperature of the object. On the other hand, light shiny surfaces are poor absorbers and poor emitters of infrared radiation. However, light shiny surfaces are great reflectors of IR radiation. Therefore, an emitter from a reflector can be differentiated and for reflective surfaces, it is even possible to determine the visible RGB color the reflector.

The activity of an emitter can be analyzed by the quality and amount of the IR photons. A very active plant would produce a higher photon emission rate resulting in a more saturated IR readout whereas an inactive plant would produce a rather pale IR readout.

Figure 2:
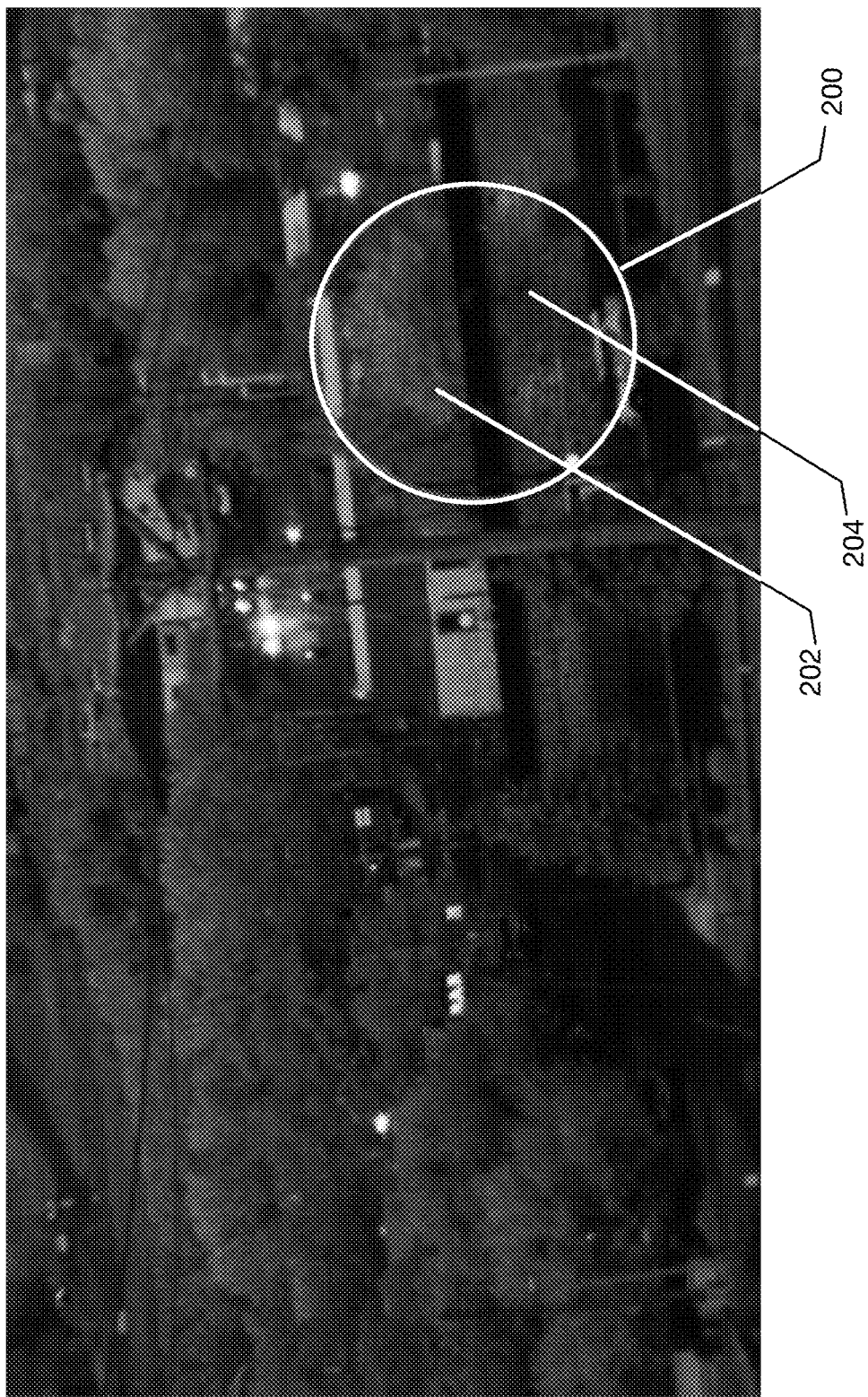
FIG. 2 is the unprocessed image of FIGS. 1A and 1B taken in very low-level lighting during the night and represents the raw image data that has been converted to digitized RGB/IR.

FIG. 2 is the unprocessed image of FIGS. 1A and 1B taken in very low-level lighting during the night and represents the raw image data that has been converted to digitized RGB/IR. What is displayed in the image of FIG. 2 is all channels (the R, G, B, and IR spectrum) that have not yet been processed by the algorithm. Looking again at FIG. 1A, the result of FIG. 2 being processed by the algorithm is displayed. This processing would include conducting all functions including colorization.

FIG. 2 also includes an area 200 that is within a white circle. This high-lighted area in FIG. 2 points out the difference between an emitter 202 (tree) and a reflector 204 (wall). In the illustrated image, it is clear that the wall reflector 204 has less Ir energy and has additional R, G, B information. As such, the reflector 204 is more red than pink.

Passive IR/Visible Image Capture

There are several sensors that can capture visible light, near infrared light, and short wave infrared (Visible/NIR/SWIR). These sensors typically operate in a wavelength range between 380 nm and 1400 nm. Passive sensors can be utilized. The passive sensors do not relay or radiate any IR energy to capture the above-identified wavelength bandwidth and therefore cannot be detected by any IR receiver. In addition, for the various embodiments of the PCNV algorithm, no active visible light or IR emitters are needed to illuminate the environment. Instead, the algorithm relies on the IR emitted from plants, reflected from surfaces and from other light sources.

Figure 3:
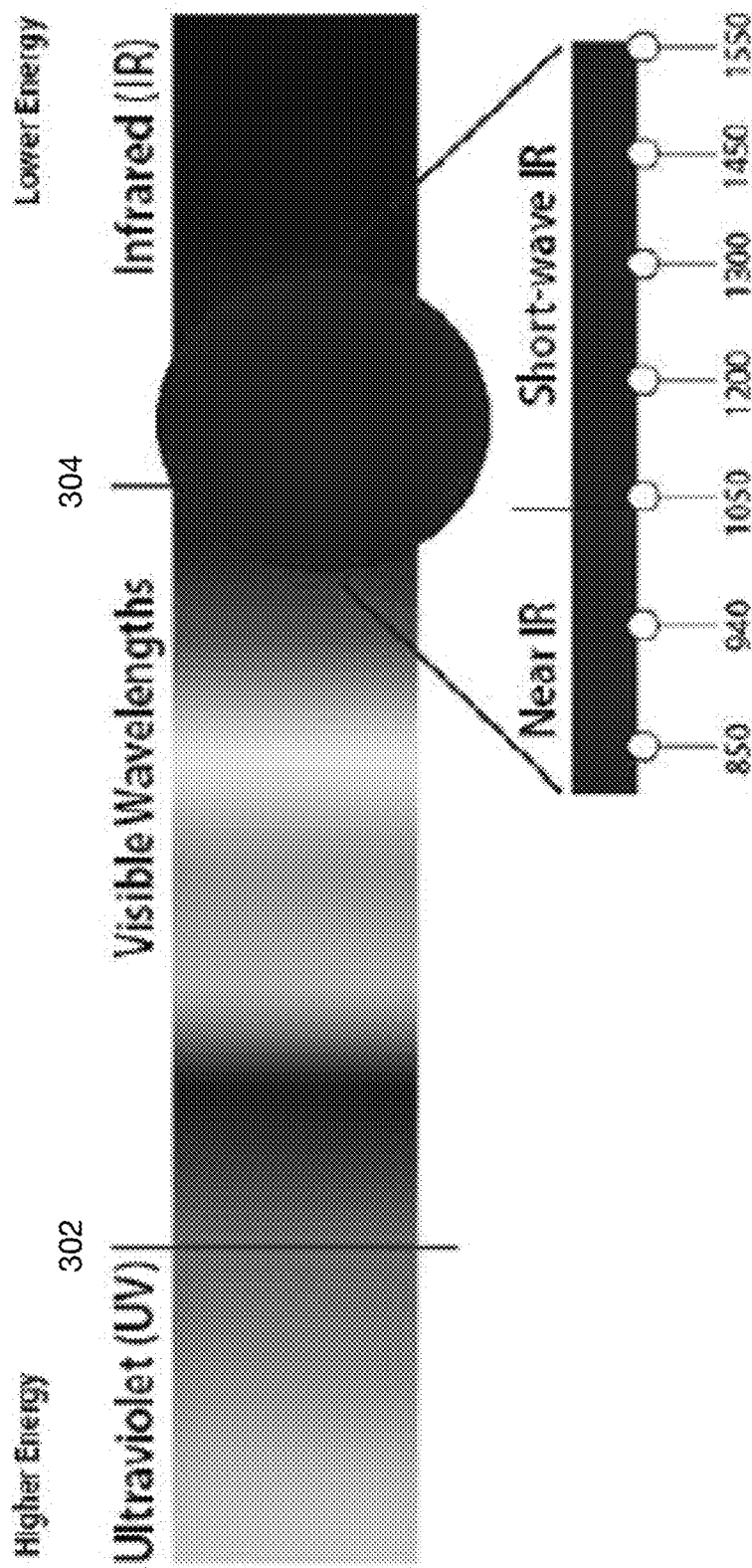
FIG. 3 is a diagram illustrating the natural occurring wavelength.

FIG. 3 is a diagram illustrating the natural occurring wavelength. The Ultraviolet light frequencies are on the left of the spectrum and the infrared light frequencies are on the right of the spectrum. The visible light frequencies are in the middle ranging from about 380 nm at point 302 to about 820 nm at point 304. In an exemplary embodiment, the sensor used to capture the image operates to capture the visible range (about 380 nm to just under 850 nm) and the near infrared (ranging from just under 850 nm to about 1050 nm) and short-wave infrared (NIR/SWIR) (ranging from just under 1050 nm to 1400 nm or more) for a total range of about 380 nm to 1400 nm or more. Advantageously, identifying the energy over this range allows for excellent performance in low-light environments. One available sensor that can be utilized in the various embodiments is the SONY IMX 462 image sensor as a non-limiting example.

The passive color night vision algorithm utilizes the raw data captured by the sensor and further processing of the raw data to generate high-definition color night vision as is described in further detail following.

Sensor Data Acquisition

Sensors are utilized to capture or acquire raw data to be processed by various embodiments of the PCNV. The sensors sample raw analog data within the visible, NIR, and SWIR color-range from approximately 380 nm to 1400 nm. The raw data is converted to digital format and streamed to the ISP (image signal processor) at which point the PCNV algorithm operates to manipulate the captured digital data.

Figures 4A, 4B:
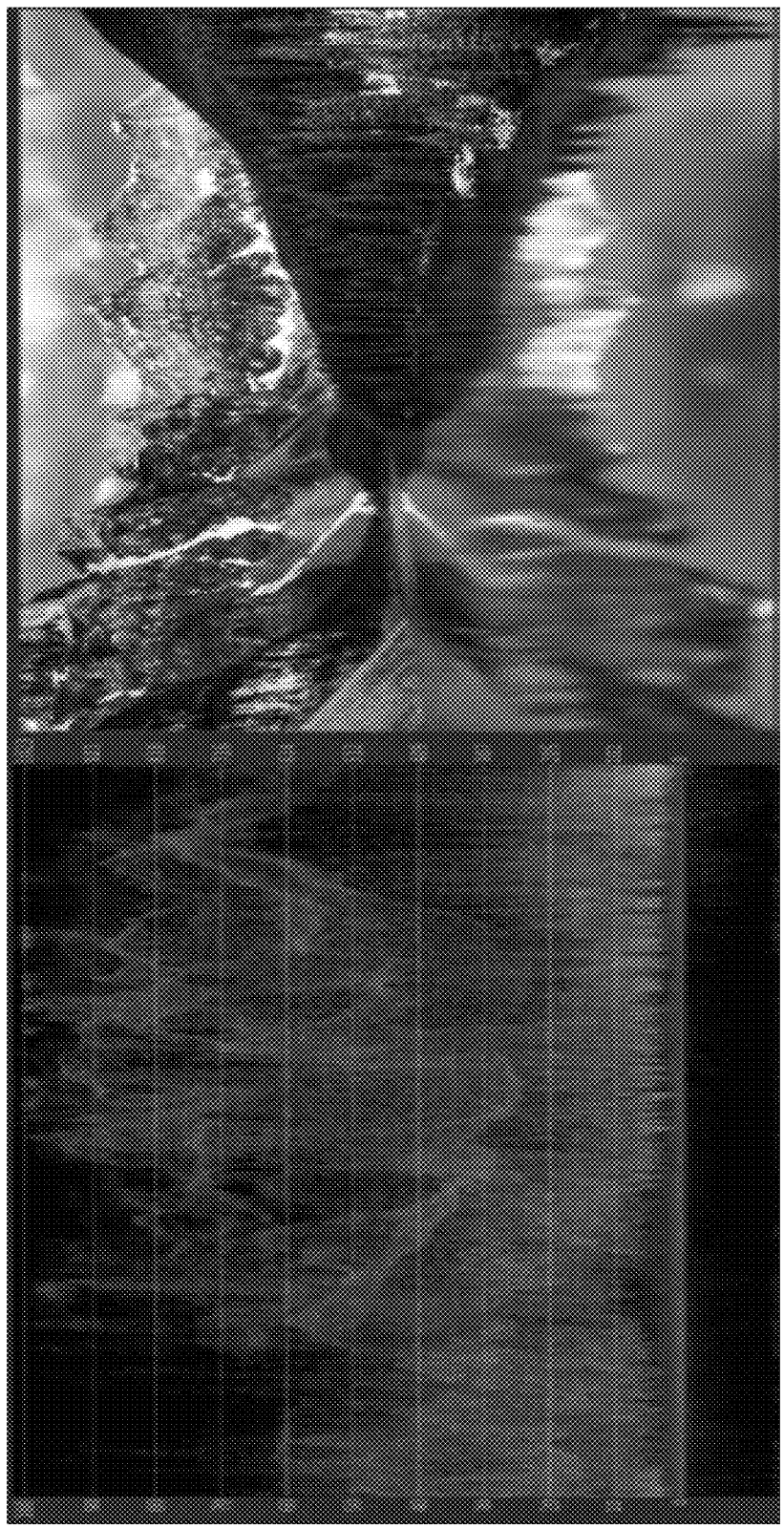
FIG. 4A illustrates the results of an RGB spectrum analyzer scope capturing raw sensor data and displaying intensity and wavelength for a particular scene.
FIG. 4B illustrates the processed RGB version of the visible image that was captured in FIG. 4A.

FIG. 4A illustrates the results of an RGB spectrum analyzer scope capturing raw sensor data and displaying intensity and wavelength for a particular scene. The vertical axis illustrates the color intensity of the scene for the RGB wavelengths, and the horizontal axis represents the space. FIG. 4B is the processed RGB version of the visible image that was captured in FIG. 4A.

Figure 5:
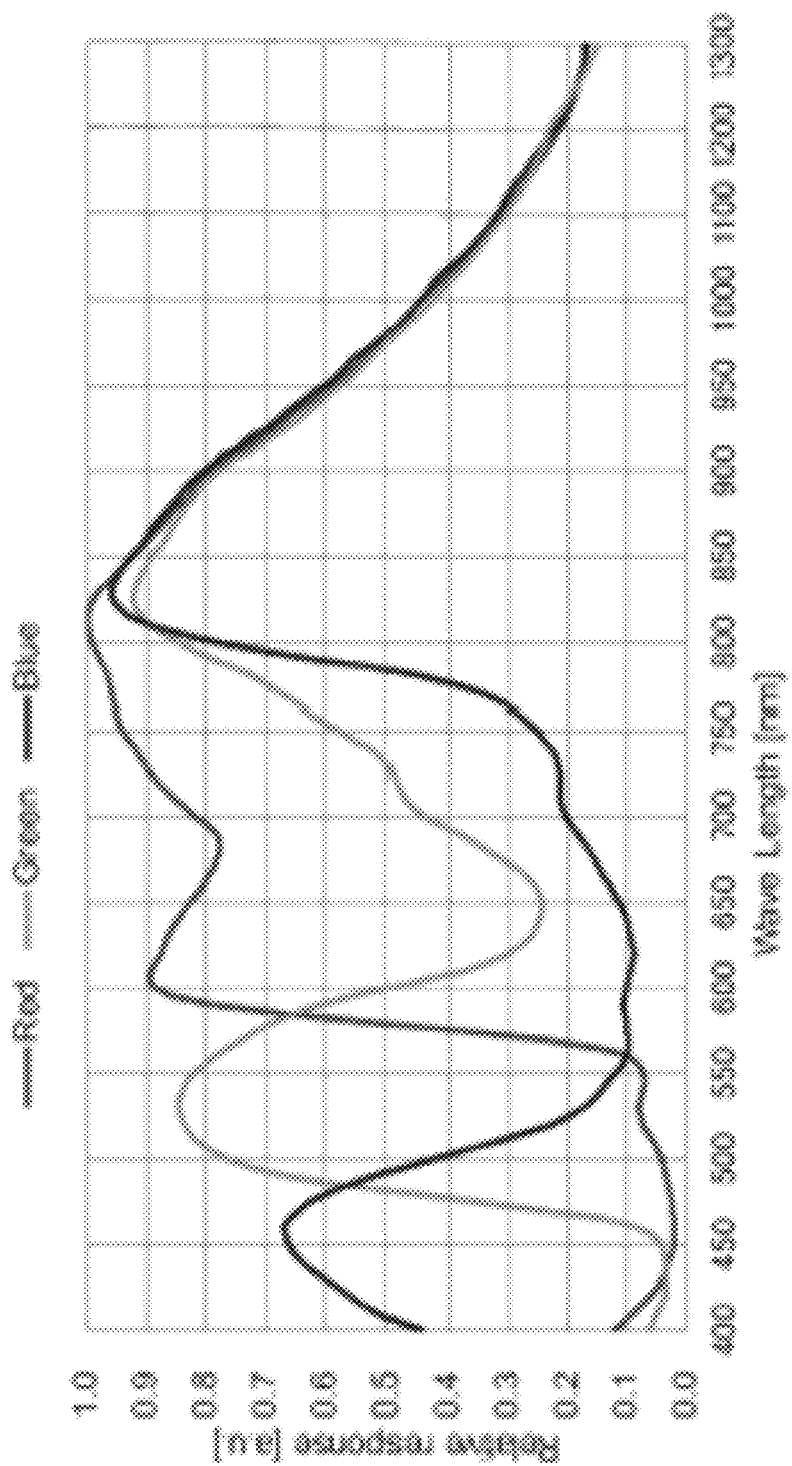
FIG. 5 is a graph illustrating a simplified representation of raw image data of visible and IR wavelength representing the highest intensity at their specific wavelength in correlation.

FIG. 5 is a graph illustrating a simplified representation of raw image data of visible and IR wavelength representing the highest intensity at their specific wavelength in correlation. Above the 850 nm frequency, it can be seen that the red, blue and green channels merge.

RGB and IR Breakdown

Figure 6A:
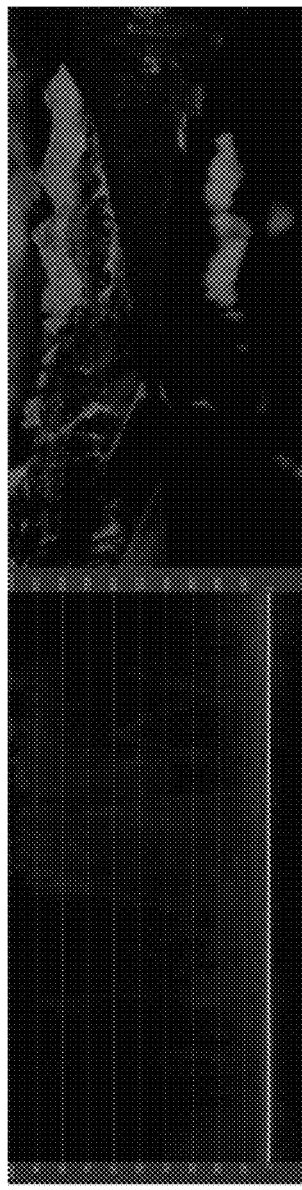
FIG. 6A is the image captured in FIG. 4 with just the red light being illustrated, with the left side slide illustrating the intensity of the red light using an RGB spectrum analyzer.
Figure 6B:
FIG. 6B is the image captured in FIG. 4 with just the green light being illustrated, with the left side slide illustrating the intensity of the green light using an RGB spectrum analyzer.
Figure 6C:
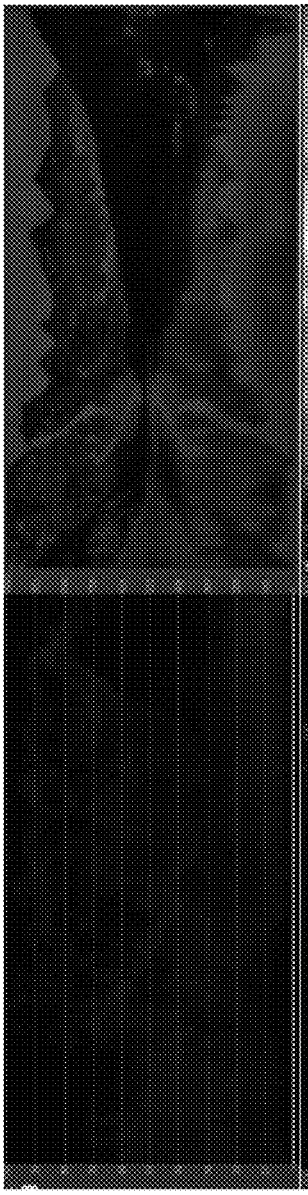
FIG. 6C is the image captured in FIG. 4 with just the blue light being illustrated, with the left side slide illustrating the intensity of the blue light using an RGB spectrum analyzer.
Figure 6D:
FIG. 6D is the image captured in FIG. 4 with just the IR light being illustrated, with the left side slide illustrating the intensity of the IR light using an RGB spectrum analyzer.

FIG. 6A is the image captured in FIG. 4 with just the red light being illustrated, with the left side slide illustrating the intensity of the red light using an RGB spectrum analyzer. FIG. 6B is the image captured in FIG. 4 with just the green light being illustrated, with the left side slide illustrating the intensity of the green light using an RGB spectrum analyzer. FIG. 6C is the image captured in FIG. 4 with just the blue light being illustrated, with the left side slide illustrating the intensity of the blue light using an RGB spectrum analyzer. FIG. 6D is the image captured in FIG. 4 with just the IR light being illustrated, with the left side slide illustrating the intensity of the IR light using an RGB spectrum analyzer. Thus, FIGS. 6A-6D illustrate the intensity and wavelength of each channel separately including IR for each individual image pixel. As a non-limiting example, the unprocessed source R, G, B, and IR data could be digitized using a 12-bit Analog to Digital converter.

Data-Stream Manipulation

Once the data stream is obtained, algorithmic functions or processes are utilized to adjust the data for the final reproduction.

IR-Gain

To compensate for the decreasing amount of photons captured by the sensor within the IR wavelength band, the photon count is multiplied dynamically. The process of multiplying the photon count involves analyzing the data stream and applying a multiplier (gain function) to the IR sampled data in real-time and progressively lifting the intensity of the wavelength (approximately 780 nm to 1400 nm). Each channel is considered and compared very carefully, thus preserving the data necessary to benefit from the Kautsky effect.

The application of the IR-Gain to the RGB values operates to normalize the detected RGB values. The algorithm to perform this action is as follows:

$$\begin{pmatrix} Rout1 \\ Gout1 \\ Bout1 \end{pmatrix} = \begin{pmatrix} Rin \\ Gin \\ Bin \end{pmatrix} \pm IRin * (RGBir \text{ Luma Matrix}) \quad \text{Equation 1}$$

Where the value Rin, Gin and Bin are the respective values for each pixel in the captured image, based on what is read from the sensor. The IRin is the value of intensity of the IR light for each pixel in the image. For each channel (R, G, and B), the high and the low points of the intensity are determined (i.e., the brightest spot and the darkest spot in the image or brightest pixel and darkest pixel). The points between these two extremes are then assigned in accordance with a function, such as linearly (and thus extrapolated) as a non-limiting example, based on the value of the illumination.

The IRin value can then be used to adjust the RGB values. RGB color values include three parameters, one for each channel. The values of each channel in the RGB color ranges from 0 to FFh or 255 decimal. For example the following RGB values produce the indicated colors:

RGB (0, 0, 0)=black
RGB (255, 255, 255)=white
RGB (128, 128, 128)=gray
RGB (255, 0, 0)=saturated red
RGB (0, 255, 0)=saturated green RGB (0, 0, 255)=saturated blue The normalization operation for the pixels in a captured image can best be represented by a few examples:

Example 1

In an image captured at night, an exemplary pixel value may be RGB (10, 5, 10) but the pixel may have an IR value of 128 as an example. Referring to Equation 1, the RGB value would be normalized and adjusted by the IR value as follows:

Rout1=Rin+/−IRin=10+128=138

Gout1=Gin+/−IRin=05+128=133

Bout1=Bin+/−IRin=10+128=138 for an adjusted RGB value of RGBir=(138, 133, 138).

However, if the adjustment of the RGB value would result in a number greater than 255, then rather than increasing the values by IRin, the values are decreased. For example, consider RGBin being (240, 230, 250) and an IRin being 130. Adding the IRin of 130 to each of the RGBin values would result in them being clipped, or exceeding the value of 255. This scenario causes the detail that would ordinarily be available to be lost. As such, in this scenario the IRin value is subtracted from the RGBin values as follows:

Rout1=Rin+/−IRin=240−130=110

Gout1=Gin+/−IRin=230−130=100

Bout1=Bin+/−IRin=250−130=120 for an adjusted RGB value of RGBir=(110, 100, 120)

This operation results in preserving the detail of the picture. The IR value is used for intensity, not color and so it is used for adjusting the contrast of the picture thus maintaining the details. Without this extra decision level, the details may be clipped and result in an over exposed picture. For instance, by taking a normal camera and locking the iris to auto exposer for taking a picture of landscape, the result is a detailed picture with varying colors. However, if the camera is pointed towards the sun, the image is over-exposed and all of the details and color changes are blown out.

In some instances, the image sensor may return negative values for the RGB value. For instance, the sensor may read RGBin being (−10, −5, −10) with an IRin of 50. A negative image is a total inversion, in which light areas appear dark and vice versa. A negative color image is additionally color-reversed, with red areas appearing cyan, greens appearing magenta, and blues appearing yellow, and vice versa.

In this scenario, the adjustment is as follows:

Rout1=Rin+/−IRin=−10+50=40

Gout1=Gin+/−IRin=−05+50=45

Bout1=Bin+/−IRin=−10+50=40 for an adjusted RGB value of RGBir=(40, 45, 40), thus moving the pixel from unseeable to visible. Similarly, if RGB values are above 255, the IRin is used to bring those values within the range of 0 to 255.

Thus, it will be appreciated that the IRin that is detected by the sensor can be used to enhance and clarify the color that is associated with the pixel. However, as previously mentioned, simply adjusting the RGB values with the IRin is based on a particular function, such as a linear transformation as a non-limiting example. It is desirable to be able to adjust the RGB values in a manner that enhances the contrast of the image and brings out better details of the color and the edges. As such, the IRin value that is added to the RGBin values can be multiplied by the luma matrix. The luma matrix operates to normalize the RGB values.

In an exemplary example, the luma matrix is a table that includes a constant for each possible value of the RGBir. Adjusting the RGB value by the IRin multiplied by the luma matrix can move the pixels from a color that is still flat or desaturated to a level that enhances the detail. Thus, the luma or brightness or intensity of the RGB value is adjusted by the luma matrix and the IRin value, which results in the value of RGBout.

The luma matrix may be a user and/or machine (or both) defined matrix that normalizes the RGB values to be within the range of 0 to 255, in view of the amount of infrared light detected, and attempts to balance each of the pixels in an image by identifying the brightest spot and the darkest spot in the image and making sure that all of the pixels in the image are squeezed in the 0 to 256 range and between the range of the brightest spot and the darkest spot. As previously mentioned, adjusting the RGB value obtained from the sensor by just the IRin value would result in a very linear transformation. However, by adjusting by the IRin by multiplying it with the luma matrix, more contrast can be brought into the image.

In one non-limiting example, the values of the luma matrix may be based on a gamma curve. The gamma curve operates to push the blacks closer together and the whites closer together (or compressing them) to allow for more information to be realized in the mid-range. Thus, the luma matrix may be an implementation of a gamma or a modified gamma curve.

Gamma encoding of images is used to optimize the usage of bits when encoding an image, or bandwidth used to transport an image, by taking advantage of the non-linear manner in which humans perceive light and color. The human perception of brightness (lightness), under common illumination conditions (neither pitch black nor blindingly bright), follows an approximate power function (note: no relation to the gamma function), with greater sensitivity to relative differences between darker tones than between lighter tones, consistent with the Stevens power law for brightness perception. If images are not gamma-encoded, they may allocate too many bits or too much bandwidth to highlights or elements that humans cannot differentiate, and too few bits or too little bandwidth to shadow values that humans are sensitive to and would require more bits/bandwidth to maintain the same visual quality.

Figure 7A:
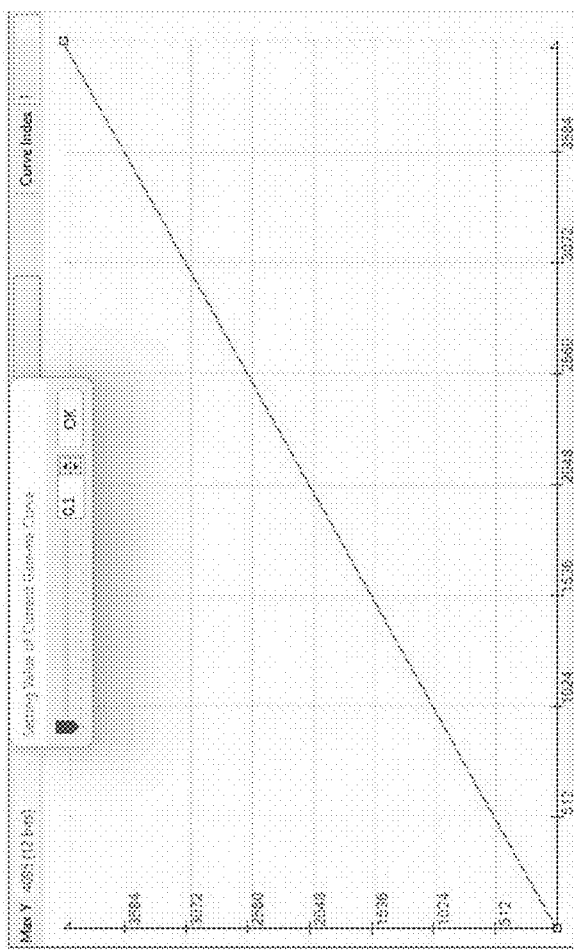
FIG. 7A is a plotted gamma curve wherein the gamma value is set to 0 and is thus linear. For certain displays, as a non-limiting example, a gamma value of 0.8 may be used.
Figure 7B:
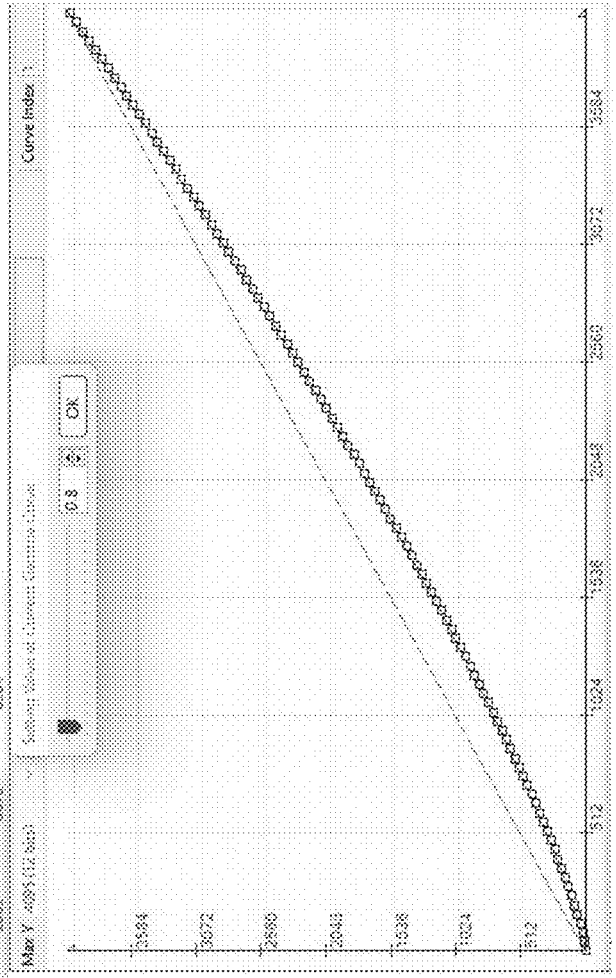
FIG. 7B is a plotted gamma curve wherein the gamma value is set to 0.8 and thus showing a slight parabolic curve resulting in a higher contrast.

The gamma curve or luma matrix works individually on each channel wherein the RGBIr is a 4-channel curve. The luma matrix includes a separate curve for each channel. The luma matrix may be a straight implementation (i.e., linear at a gamma value of 0) of the gamma curve and then adjusted to get a desired effect. FIG. 7A is a plotted gamma curve wherein the gamma value is set to 0 and is thus linear. For certain displays, as a non-limiting example, a gamma value of 0.8 may be used. FIG. 7B is a plotted gamma curve wherein the gamma value is set to 0.8 and thus showing a slight parabolic curve resulting in a higher contrast. Further, the luma matrix may be adjusted depending on the type of image being viewed, the type of display that will be used to present the image, the characteristics of the sensor, any desired effects for the final product.

Rin, Gin, Bin values are normally present between 380 nm-780 nm (visible spectrum) and strongly decline beyond 780 nm. The signal strength is dependent upon the sensor sensitivity and declines at higher wavelength values. Values higher than 1400 nm are too weak and produce mostly signal noise and are therefore clipped. Clipping is achieved by limiting the data-acquisition to 1400 nm.

The visible RGB values (380 nm-780 nm) that are obtained during the daytime are not to be manipulated. Rather, only the RGB values captured during low-light conditions are adjusted by the IRin value multiplied by the RGBir luma matrix.

As previously mentioned, the luma matrix may be generated by a user, a machine, or a combination of both. An elegance of the exemplary embodiments is that luma matrixes may be created and adapted for use in different settings and be dynamically adjust to attain optimal results. For instance, different matrixes may be generated for city shots or country shots. The matrix can be generated dynamically by comparing shots taken during the daytime and shots taken at night. The proximity of the adjusted photos taken in the dark in comparison to photos taken during daylight can be algorithmically fed into a matrix generator. Further, shapes of items in a picture can be used to identify the type of surface and thus provide insight into how photons bouncing off of the surface would be received. For instance, the shapes within the photo can be examined to find automobiles, trucks, buildings, lamp posts, mailboxes, billboards, animals, people, etc. Those skilled in the art will be familiar with the characteristics of the light being absorbed, reflected or emitted from such items. Thus, this information can be used to dynamically adjust the luma matrix. Other information may also be used to adjust and/or select the luma matrix. This information may include the season in which the photo is being taken. During the spring, summer and fall the color attributed to various foliage may be drastically different. Further, the absence of the foliage in the winter may result in a significant reduction in emitted photons. All of this information can be utilized, along with the implementation of a gamma curve, to create optimal luma matrixes.

Figure 8B:
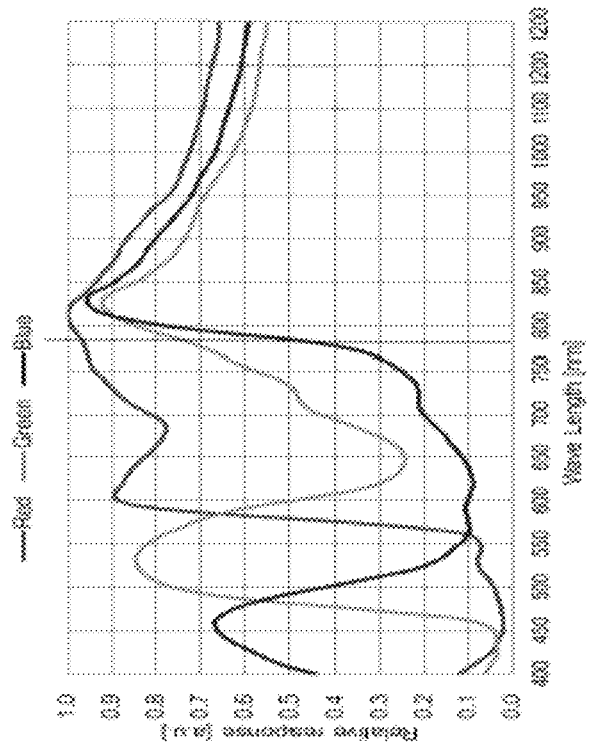
FIG. 8B is a chart illustrating the RGB values after the application of normalization based on the IRin and the luma matrix.
Figure 8A:
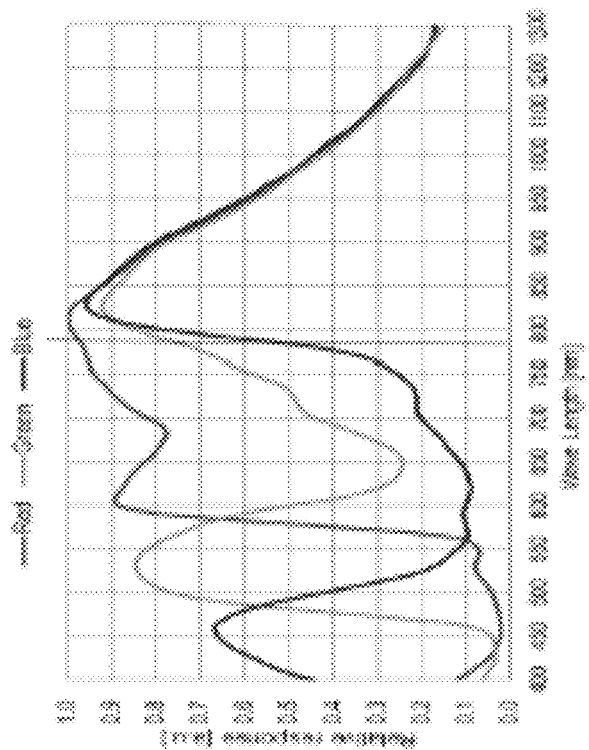
FIG. 8A is a chart illustrating the RGB values before the application of normalization based on the IRin and the luma matrix.

FIG. 8A is a chart illustrating the RGB values before the application of normalization based on the IRin and the luma matrix. FIG. 8B is a chart illustrating the RGB values after the application of normalization based on the IRin and luma matrix. It can be observed that the RGB channels beyond the 780 nm wavelength point are separated in FIG. 8B whereas in FIG. 8A they are merged. The separation is achieved and due on account of preserving the bio-chemical data found in the IR band. This effect can be better appreciated by examining FIGS. 98A and 9B.

FIG. 9A illustrates the raw sensor data of an image illustrating the intensity of the RGB channels. FIG. 9B illustrates the same image of FIG. 9A before being adjusted.

FIG. 10A illustrates the raw sensor data after the application of RGB balance by adjustment with the IRin multiplied by the luma matrix. FIG. 10B illustrates the effect on the image from FIG. 9B.

Once the R, G, B and the IR data received is compensated by equation 1, the Rout1, Gout1 and Bout1 values are adjusted with hue and chroma. The Hue Angle [H] from the input is shifted to the new Hue Angle [H M] and the chroma values are then adjusted.

In colorimetry, the Munsell color system is a color space that specifies colors based on three properties of color: hue (basic color), chroma (color intensity), and value (lightness). It was created by Professor Albert H. Munsell in the first decade of the 20th century and adopted by the United States Department of Agriculture (USDA) as the official color system for soil research in the 1930s.

The system consists of three independent properties of color which can be represented cylindrically in three dimensions as an irregular color solid:
Hue—measured by degrees around horizontal circles
Chroma—measured radially outward from the neutral (gray) vertical axis
Value—measured vertically on the core cylinder from 0 (black) to 10 (white)

Figure 11:
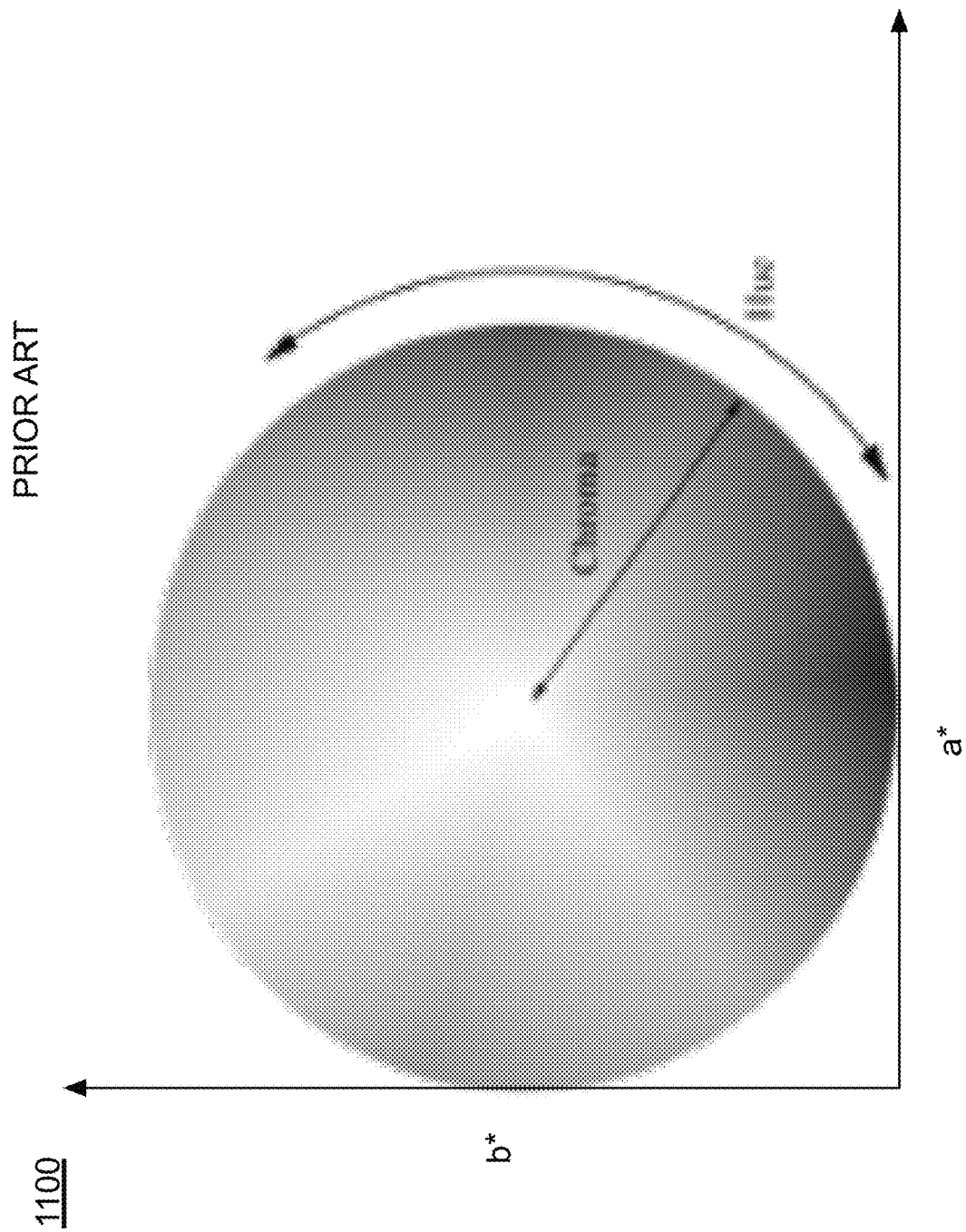
FIG. 11 is a representation of a Munsell color solid model.

FIG. 11 is a representation of a Munsell color solid model. In the illustrated Munsell Color Solid model 1100 (the Munsell 3D color model):
Hues change as a selected position is moved around the center of the model 1100;
Value changes as a selected position is moved between the top and the bottom of the model 1100; and
Chroma changes as the selected position is moved from or toward the center of the model 1100.

Rout-HC $$Gout\text{-}HC = 2(C1 C2)^{1/2} \sin(h/2)$$

Bout-HC
Where:
$C = (a^{*2} + b^{*2})^{1/2}$ is the chroma with a* and b* being a vector from the center of the model 1100 to the perimeter and,
H being the angle of the vector to define the hue angle:
Rout-HC, Gout-HC, Bout-HC are based on chroma, C1 C2 and hue angle, H (using a*b*).

The adjusted Hue and Chroma values are Rout-HC, Gout-HC and Bout-HC.

3D-LUT Color-Manipulation

LUT, which stands for look-up table, is a term used to describe a predetermined array of numbers that provides a shortcut for a specific computation. In the field of color grading, LUT is used to convert input color values into different output color values.

In other words, a LUT is a smart video preset that operates as a state machine. In other words, for any particular input, a specific output is programmed into the LUT such that each input state results in a particular output state than can be manually and/or automatically created and having a static and/or dynamic existence. This video preset is used to perform color grading and change the appearance of color within a given video-stream.

Figures 12A, 12B:
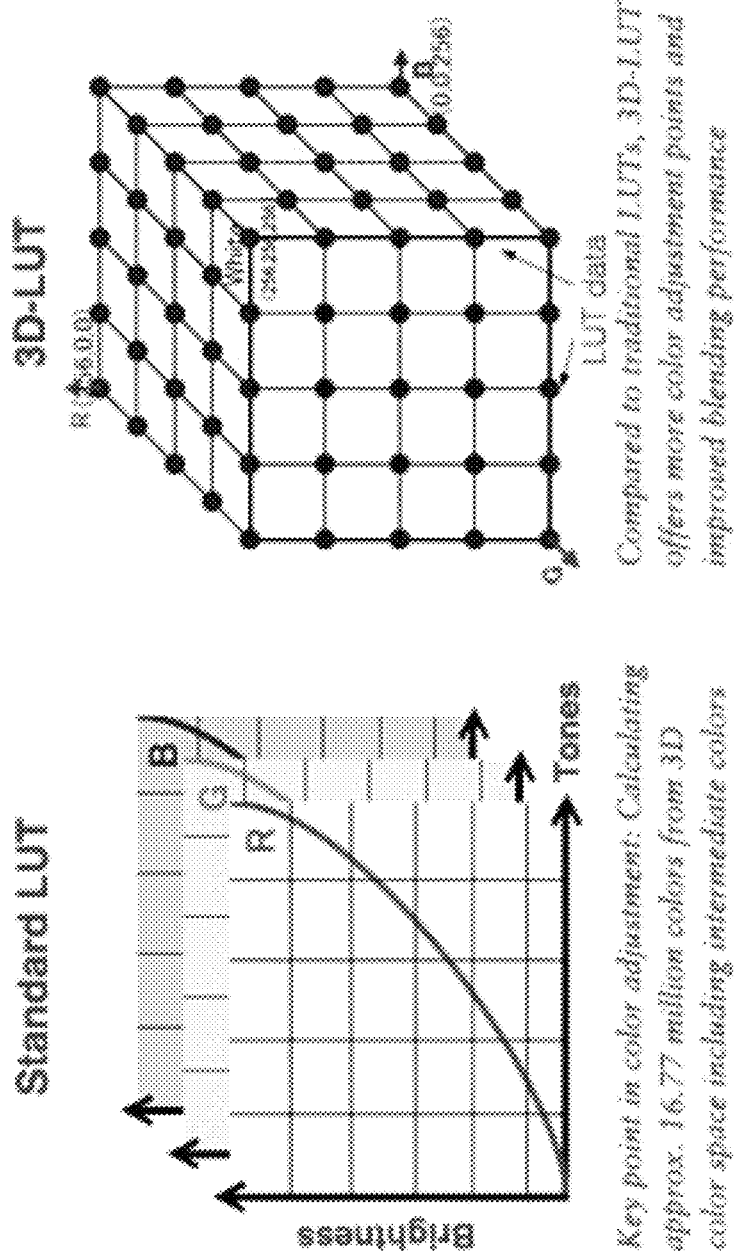
FIG. 12A is standard LUT.
FIG. 12B illustrates a 3D-LUT.
Figure 12C:
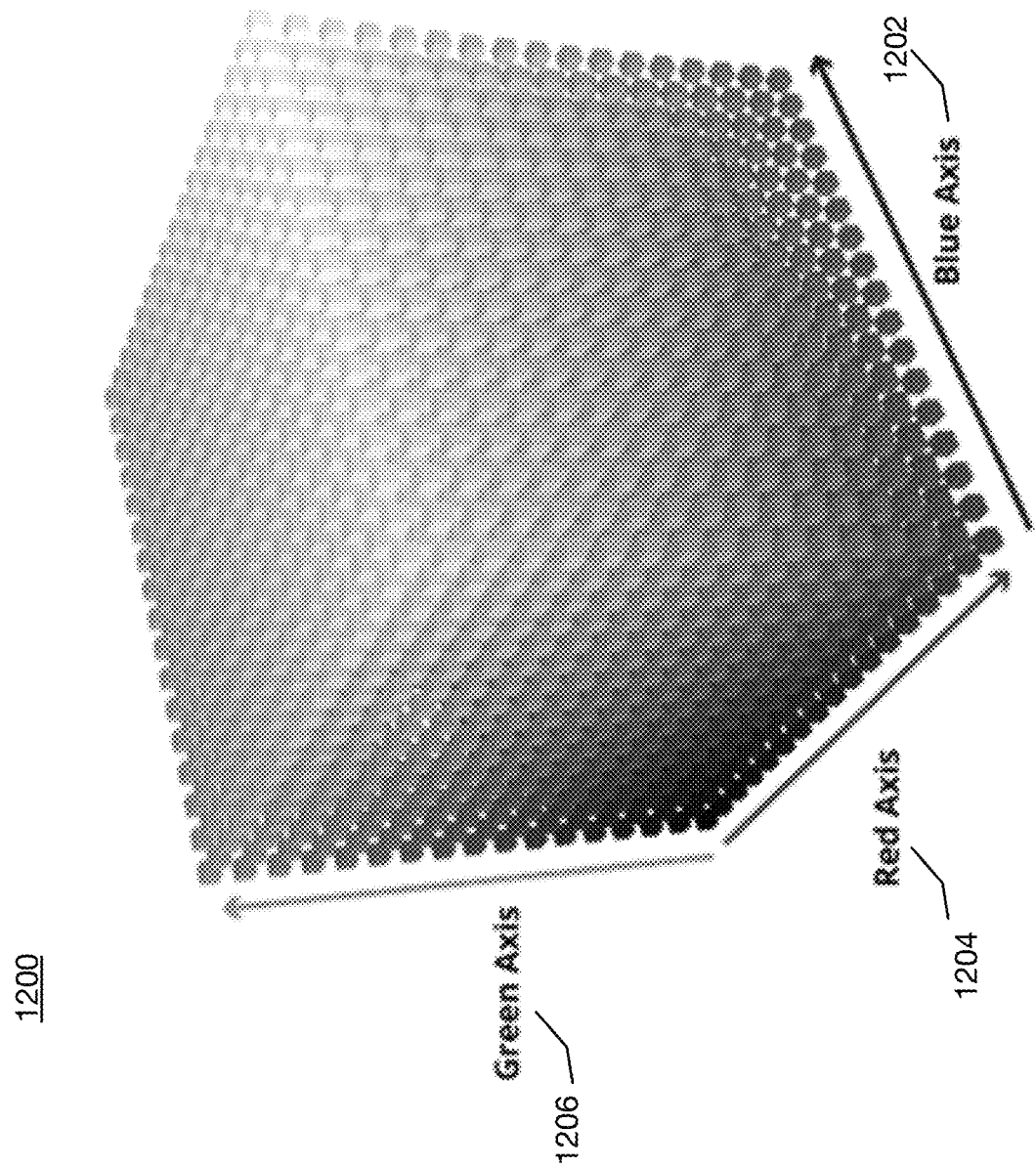
FIG. 12C is a full color representation of a 3D-LUT.

1D LUT and 3D LUT are the most common types of LUTs. 1D LUT is controlled by a single parameter value and can be simplified to a preset gamma curve, which is sufficient for making basic color balance and contrast adjustments, while 3D LUT maps hue, saturation, and brightness to a single axis to control specific color values in the image. FIG. 12A illustrates a standard LUT. FIG. 12B illustrates a 3D-LUT. FIG. 12C is a full color representation of a 3D-LUT. In the illustrated full-color 3D LUT 1200, the LUT 1200 is shown as including a Blue Axis 1202, a Red Axis 1204 and a Green Axis 1206.

It should be appreciated by those skilled in the art that plants emit an amount of infrared. In addition, this plant emitted infrared also reflects off of other surfaces. The way the infrared is emitted, such as the infrared emitted from plants, and reflected provides some insight and information into the actual colors of an image that is being viewed, information that cannot readily be ascertained due to low-light conditions.

The 3D LUT is a look up table that is used to move the RGB values toward their desired color, adjusting the color tone or hue, and the brightness. Thus, an RGBin value of (128, 128, 128) (or 50% grey) can be adjusted to make it green RGB (100, 200, 100) by the values that are stored in the 3D LUT.

$$\begin{pmatrix} Rout \\ Gout \\ Bout \end{pmatrix} = \begin{pmatrix} Rout - HC \\ Gout - HC \\ Bout - HC \end{pmatrix} * (3 \ DLUT \ \text{Table})$$  Equation 2

The final output from the color-manipulation operation of Rout, Gout and Bout can be calculated using Equation 2. Equation 2 presents an algorithm utilized to adjust the Hue and Chroma of the RGBir values to achieve a natural color representation. Because of the Kautsky effect, data has been preserved in the calculation of Equation 1 and as such, no additional effort is needed to determine the difference between emitter and reflector.

The plant does not have a color at night but emits infrared, and since the wavelength is known based on Kautsky, we can determine that that object is an emitter. If another object is nearby the emitter, the photons will bounce off the surface of the nearby object and will be falsified because it is not an emitter and the color is off. It reflects back an infrared value and a single digit RGB value (i.e. a red car would be 200IR 2R 0B 0G so we know it is red). IR intensity can tell if an object is shiny or flat, metal or concrete etc. Shiny objects have a lower value while matted objects have a higher value. A flat surface or matted surface tends to reflect more color as compared to a shiny surface that tends to reflect the environment, like a mirror. As such, for a white car you see mostly color whereas with a black car mostly reflection is observed.

The color space of an image can be pictured like a 3D cloud in color space. Within the color space you have areas that are divided R G B. A picking tool is utilized to pick a color. The cloud presents all the primary R G B and the mix of colors in the spectrum obtained by adjusting the values of RGB. If an image is being shot outdoors, you need a different color space than you do if it is being shot indoors. Further, different indoor and outdoor lighting may require different color spaces as well. Video has different color spaces RECK 609 709 2020 (reddish) etc. and film has an infinite number of colors available, three layers, it is analog, LK 47, 49 67, film materials give you warmer image for western, etc.

As a non-limiting example of the operation of Equation 2, take a pixel having an RGB value of (200, 0, 30), which is a pink. Running this color setting through the equations it can be converted to green. To accomplish this, the 3DLUT table must be built, based on knowledge obtained from the image, known characteristics of light and infrared light, the reactions of emitted infrared and reflected infrared, etc. to develop a 3DLUT table that will achieve accurate and desired results. Hue Angle (a,b) is used to select the color from the color space. The variable a selects the angle from the center of the color space and the parameter b selects the brightness or saturation or the distance from white.

Hue angle a is intensity from center whereas b is position in cloud or angle. This results in giving a color value with 3 components RGB (XX YY ZZ), which is the number for that pixel in the image. In converting a picture taken at night into a detailed color image, the process must be able to distinguish objects, such as determining if an object is a tree or a wall. If the object is a tree, the R value would be heavy, like (200, 3, 2) as a non-limiting example. This information helps to determine if it is an emitting color with a large amount of IR in it (200 50 100) or if it is a leaf color. As a non-limiting example, a brown fence will not reflect blue color. When photon emitted from a tree hits such a fence it may be (180 40 40). The 3DLUT could result in changing this to (115, 80, 10) to make it brown rather than red.

For instance, the H(a,b) are two numbers in the color cloud, intensity and where in space the RGB value is. The (a,b) is the input number for H, Hue Angle. However, with the 3DLUT, the color mappings can be deformed to achieve the desired result. Similar to the luma matrix, the 3DLUT can be generated manually by a user, automatically/dynamically by a machine or algorithmic process, or a combination of both. For instance, the 3DLUT can be set up so that everything that is 30 red can be translated down to 5 green but yet not to rotate or move blue items the same amount. Chroma is intensity. The incoming RGB values are multiplied by incoming Chroma which is also a wheel, and the 3D LUT table is utilized to deform the cloud. Like pulling on a spider web, the color space is deformed such that the transformation of one RGB value may not be the same as another value. Hue, Saturation and Brightness are all adjusted with the use of the 3DLUT. But, with knowledge of different surfaces, different emitters, different reaction of various surfaces to photon absorption, reflection and generation, the values of the 3DLUT can be adjusted to achieve optimal performance for differing environments.

The Hue and Chroma basically identifies the colors and the 3DLUT shifts them to what it would look like in daytime. As such, the 3DLUT is a user and/or machine (or a combination thereof) generated table that is a proprietary table used to achieve the desired results.

Figure 13:
FIG. 13 is an enlargement of the image in FIG. 10B.

FIG. 13 is an enlargement of the image in FIG. 10B. As shown in FIG. 13, it is noticeable that the primary color has a red hue. This is due to the lack of visible light and dominance of IR light at night. By analyzing the RGB color values of each available pixel and taking the visible RGB values that are still available (>0.001 LUX intensity) the actual color that should be presented can be determined and then the application of a multiplier for each RGB value can be used to adjust it. It is apparent that the Red channel is dominant, therefore the Green and Blue channels are considered in relationship to the Red. In addition, the Kautsky effect can be considered to distinguish between emitter and reflector.

FIG. 14A is a 3D LUT color shift result of the image in FIG. 13.

Finally, the saturation, contrast and exposure levels are adjusted dynamically.

FIG. 14B illustrates the results of adjusting the saturation, contrast and exposure of FIG. 14A.

Figure 15:
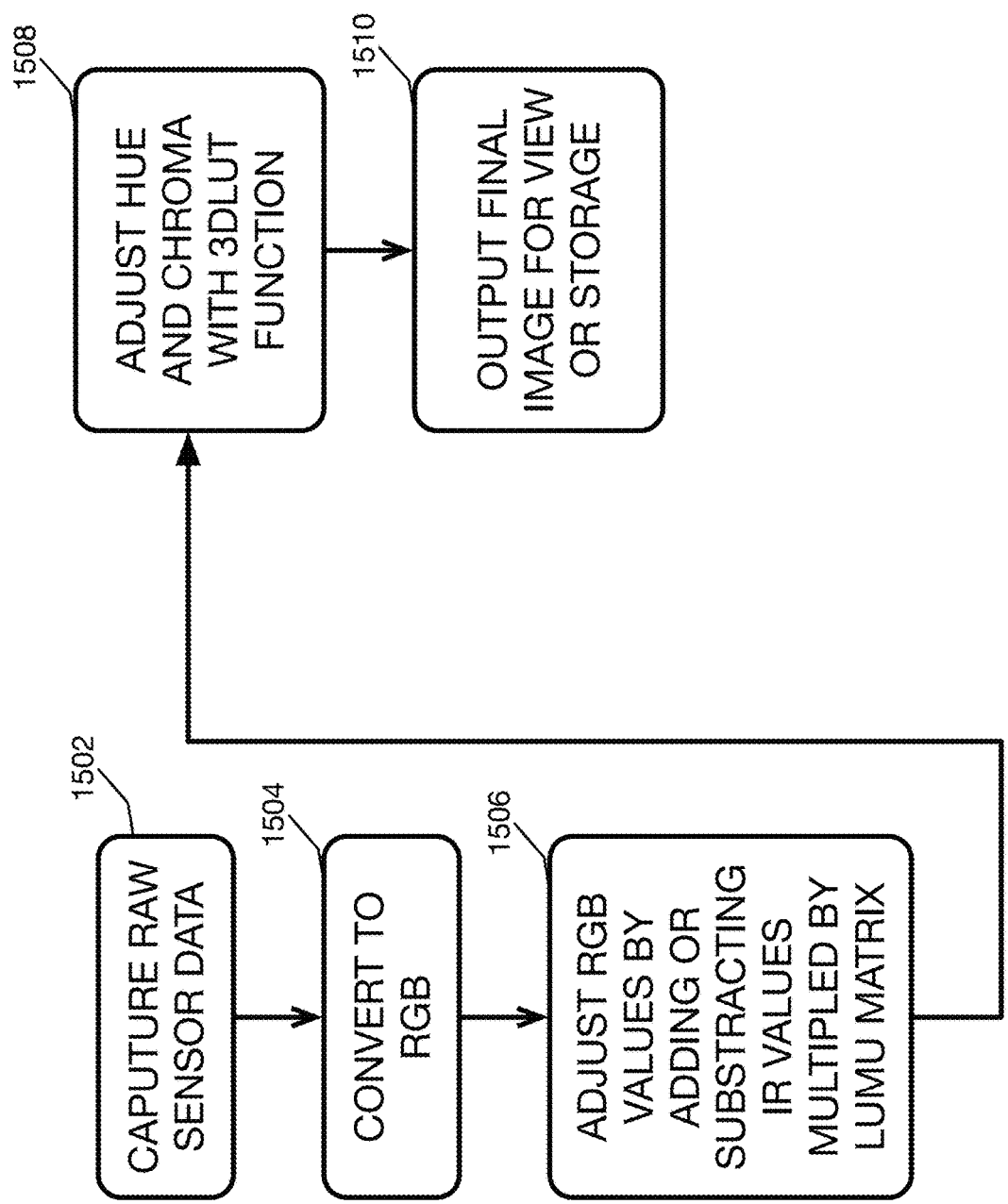
FIG. 15 is a flow diagram illustrating the process of an exemplary PCNV conversion of an image taken at night.

FIG. 15 is a flow diagram illustrating the process of an exemplary PCNV conversion of an image taken at night. Initially the raw sensor data is captured 1502. The raw sensor data simply shows the amount of illuminance. The raw sensor data is then converted to a digitize RGB file 1504. The digitized RGB file is then adjusted by the IR value obtained by the sensor, multiplied by a luma matrix (Equation 1) to help normalize the RGB values and prevent saturation or negative values 1506. The adjusted RGB values are then further modified by application of Equation 2 to adjust the hue and chroma by use of a 3D LUT function 1508. As a result, a color image is output for viewing or storage 1510.

In some embodiments, the PCNV algorithm can dynamically switch or adjust between lighted vision and night vision, or providing presentment of observable video in nighttime mode or daytime mode. As previously described, the image sensor provides a value per pixel and color. During low light conditions, these values are very low in which case the PCNV is sending corrective settings to the image sensor. The exposure (shutter) time would be extended dynamically until the sensor provides a data value that can be used by the algorithm to identify the time of day. Because a wide wavelength spectrum is being captured, higher IR values as compared to R, G, B is received. In this example, the algorithm identifies nighttime. In this case, the color correction function dynamically adjusts R, G, B using the IR data. The inverse takes place during the daytime. The R, G, B, values obtained during the daytime are close to equal or proximate to the IR data values. Therefore the algorithm, upon determining that the R, G, B values are proximate to the IR data values, concludes that the video feed is being received during the daytime and the color correction impact is then adjusted to have less effect or even no effect or adjustment (a nil). To provide realistic results in any type of lighting scenario, the LUT table utilized in the PCNV algorithm can thus be dynamically selected or adjusted. For instance, various lighting scenarios can be detected by a system employing the use of the PCNV algorithm and based on the detected lighting scenario, the value of the LUT table can be adjusted or a particular LUT table can be selected or both. For instance, the lighting scenarios may include daytime, nighttime, noon, sun facing the surfaces being examined, sun behind the surfaces being examined, daytime with cloudy weather, nighttime with no moon, nighttime with full-moon, nighttime with a mid-phase moon, nighttime with large amounts of ambient light, etc. In each of these non-limiting examples, as well as other, the LUT table utilized by the algorithm can be dynamically adjusted so as to provide the most realistic and optimal results. The various embodiments presented herein uniquely enable such performance.

Thus, what has been shown is a technique of taking data from an image sensor and preparing it, multiplying the photons data captured by the sensor with IR values and then the use of proprietary and dynamically adjusted tables to perform the colorization.

In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A method for colorization of a digital image captured in low light conditions, the method comprising the actions of:
    capturing raw image data of an image from an image sensor, the data including RGB values and IR values;
    converting the raw image data to a digital RGB file containing a viewable color image by utilizing the RGB values and the IR values;
    normalizing the RGB values by augmenting the RGB values with the IR value multiplied by a luma matrix to bias the values towards the middle of the visible spectrum;
    augmenting the normalized RGB values by applying and adjustment for each RGB value with a 3D lookup table function; and
    outputting a final colorized image.

2. The method of claim 1, wherein each RGB data set for the digital RGB file represents a pixel and the action of normalizing the RGB values comprises the actions of:
    increasing the RGB values as a function of the IR value and the luma matrix when the values are negative or near zero; and
    decreasing the RGB values as a function of the IR value and the luma matrix if increasing the values would result in saturation.

3. The method of claim 2, further comprising the actions of creating the luma matrix to apply a gamma curve to the RGB values.

4. The method of claim 3, wherein the action of creating the luma matrix further comprises augmenting the gamma curve based on intrinsic information about the environment of the image.

5. The method of claim 4, wherein the 3D lookup table is configured to map each RGB data set to a different value to most closely proximate the actual color.

6. The method of claim 5, wherein the 3D lookup table is created based on knowledge of the image, known characteristics of light and infrared light and the reactions of emitted infrared and reflected infrared light.

7. The method of claim 6, wherein the RGB values and the IR values are used to map to an adjusted RGB value.

8. The method of claim 7, wherein the 3D lookup table is further created based on knowledge of the different surfaces of items within the image, different emitters within the image and the reaction of the photons to different surfaces within the image.

9. A system configured to colorize a digital image captured in low light conditions, the system comprising the actions of:
    an image sensor configured to capture raw image data of an image, the raw image data including RGB values and IR values;
    a conversion algorithm configured to convert converting the raw image data to a digital RGB file containing a viewable color image by utilizing the RGB values and the IR values;
    a normalizing algorithm configured to normalize the RGB values by augmenting the RGB values with the IR value multiplied by a luma matrix to bias the values towards the middle of the visible spectrum; and
    a 3D lookup table function configured to augment the normalized RGB values by applying and adjustment for each RGB value with a 3D lookup table function.

10. The system of claim 9, wherein each RGB data set for the digital RGB file represents a pixel and the normalizing algorithm is configured to increase the RGB values as a function of the IR value and the luma matrix when the values are negative or near zero and to decrease the RGB values as a function of the IR value and the luma matrix if increasing the values would result in saturation.

11. The system of claim 10, further comprising the a luma matrix implements a gamma curve adjustment to the RGB values to bias them towards the middle of the visible light spectrum.

12. The system of claim 11, wherein the luma matrix further comprises an augmented gamma curve based on intrinsic information about the environment of the image.

13. The system of claim 12, wherein the 3D lookup table is configured to map each RGB data set to a different value to most closely proximate the actual color.

14. The system of claim 13, wherein the 3D lookup table is created based on knowledge of the image, known characteristics of light and infrared light and the reactions of emitted infrared and reflected infrared light.

15. The system of claim 14, wherein the RGB values and the IR values are used to map to an adjusted RGB value.

16. The system of claim 15, wherein the 3D lookup table is further created based on knowledge of the different surfaces of items within the image, different emitters within the image and the reaction of the photons to different surfaces within the image.

\* \* \* \* \*